United States Patent [19]

Meister

[11] Patent Number: 5,193,375

[45] Date of Patent: Mar. 16, 1993

[54] METHOD FOR ENHANCING THE WEAR PERFORMANCE AND LIFE CHARACTERISTICS OF A BRAKE DRUM

[75] Inventor: Thomas J. Meister, Richwood, Ohio

[73] Assignee: Metal Improvement Company, Inc., Paramus, N.J.

[21] Appl. No.: 800,550

[22] Filed: Nov. 27, 1991

[51] Int. Cl.$^5$ ................................................ C21D 9/06
[52] U.S. Cl. ..................................... 72/53; 188/218 R
[58] Field of Search ............... 51/319; 72/53; 29/90.7; 188/218 R

[56] References Cited

U.S. PATENT DOCUMENTS

| | | | |
|---|---|---|---|
| 2,077,639 | 4/1937 | Minich | 72/53 |
| 4,167,864 | 9/1979 | Taipale | 72/53 |
| 4,581,913 | 4/1986 | Reed | 72/53 |

FOREIGN PATENT DOCUMENTS

| | | | |
|---|---|---|---|
| 768603 | 8/1934 | France | 188/218 R |
| 2642087 | 7/1990 | France | 72/53 |
| 2004915 | 1/1990 | Japan | 72/53 |
| 2185926 | 7/1990 | Japan | 72/53 |

OTHER PUBLICATIONS

F. L. Main, "Brake Drum Metallurgy", Aug. 1932, S.A.E. Journal vol. 31-No. 2 pp. 330-338.

*Primary Examiner*—David Jones
*Attorney, Agent, or Firm*—Klauber & Jackson

[57] ABSTRACT

A method for enhancing the frictional wear properties, performance and life of a graphitic cast iron brake drum. The surfaces of the drum which are frictionally engaged by brake shoes, are cold worked by subjecting them to shot peening at an intensity level sufficient to induce surface and near surface residual stress, to thereby increase the resistance of said graphitic cast iron to scuffing and heat checking under conditions of dry sliding contact and frictional loading.

5 Claims, No Drawings

METHOD FOR ENHANCING THE WEAR PERFORMANCE AND LIFE CHARACTERISTICS OF A BRAKE DRUM

FIELD OF INVENTION

This invention relates generally to methodology for surface treatment of metallic work pieces, and more specifically relates to a method for surface treating graphitic cast iron brake drums so as to enhance their performance and life through increased resistance to scuffing, wear, and heat checking.

BACKGROUND OF INVENTION

In the course of the normal service of same, metallic parts such as brake drums are subjected to dry, unlubricated sliding wear and high frictional loads. These components must absorb energy between the sliding surfaces while maintaining their structural integrity (resistance to cracking) and while exhibiting reasonably predictable wear rates (resistance to scuffing and galling). Because of their physical and mechanical properties, as well as their unique microstructures, graphitic cast irons, particularly so-called gray irons, are commonly used in these applications. For purposes of this specification, we intend by use of the term "graphitic cast iron" to mean a family of cast ferrous alloys having a carbon content of at least 2%, most of which is uncombined and present in the form of free graphite. Further, as used herein, the term "gray irons" refers to specific types of graphitic cast irons in which the graphite is present in the form of flakes and which derive their name from the gray appearance of their fracture surfaces.

Under moderate operating conditions, acceptable wear rates are experienced due to adhesion and microscopic metal transfer between the contacting sliding surfaces.

However, in heavy duty service, significant amounts of metal transfer, smearing and severe surface damage, described as "scuffing and galling" may occur. The cyclic frictional heating and cooling of the sliding surfaces which accompanies such wear can also cause a network of fine, thermal fatigue cracks, termed "heat checks", to develop in the surfaces. Propagation of these cracks through the cross-section can cause the catastrophic fracture of a brake drum or similar structure. Studies have shown that scuffing and heat checking in graphitic cast irons are intimately linked to the surface properties of the components.

In practice, the wear properties, performance and life of graphitic cast iron brake drums, particularly where such drums are subjected to the heavy duty use that is incident, for example, to operation of large trucks, has been largely limited by metal impairing phenomena of the type which are above discussed. While various methodology has been considered in an effort to limit the effects of such phenomena, by and large it has been considered up to the present that the practical limit of improvement for such cast iron drums has been reached, and that the wear characteristics could not be practically extended.

In accordance with the foregoing, it may be considered an object of the present invention, to provide a method for surface treating a graphitic cast iron brake drum, which is effective in increasing the resistance of the cast iron surface to scuffing and heat checking under conditions of dry sliding contact and frictional loading.

It is a further object of the present invention, to provide a method of the foregoing character which can be carried out with existing technology and apparatus, and at fully acceptable costs.

A yet further object of the present invention is to provide a graphitic cast iron brake drum, the brake shoe engaging surfaces of which have been cold worked as to yield a product having increased resistance to scuffing and heat checking during the subsequent veh2icular use of the treated brake drum.

SUMMARY OF THE INVENTION

Now in accordance with the present invention, a method is provided for enhancing the frictional wear properties, performance and life of a graphitic cast iron brake drum. According to the method, the surfaces of the drum which are frictionally engaged by brake shoes, are cold worked by shot peening at an intensity level sufficient to induce surface and near surface residual stress, to thereby increase the resistance of the graphitic cast iron to scuffing and heat checking under conditions of dry sliding contact and frictional loading.

The shot peening is effected by impacting the surfaces to be treated with shot having a nominal diameter of from about 0.230 to 0.660 inch, to achieve substantially 100% coverage. More preferably the shot has a nominal diameter in the range of from about 0.330 to 0.550 inch with 0.550 inch being relatively optimal. The peening is preferably carried out at a high intensity, in the range from about 4C to 6C as measured by the standard Almen method. The shot utilized can comprise any of numerous materials known to be useful for such purpose, but preferably is a cast steel.

DESCRIPTION OF PREFERRED EMBODIMENT

The controlled shot peening utilized in the present invention is a process which involves bombarding the surface of a metallic work piece with a specified size of spherically shaped metal, ceramic or glass media termed "shot". The process produces a dimpled, textured surface finish, and also cold works and strain hardens the surface layers, which induces surface and near surface residual compressive stresses. Controlled shot peening increases the resistance of the graphitic cast iron to scuffing and heat checking under conditions of dry sliding contact and frictional loading by the following mechanisms:

First, the coarser surface finish provided by shot peening resists the smoothing and glazing effects of adhesive wear, providing greater scuff resistance. In addition, the pockets formed by the dimpled texture store the fine metallic wear debris, reducing the tendency for metal transfer.

The increase in the metal matrix hardness at the surface due to shot peening also reduces wear since, all things being equal, wear rates decrease with increasing surface hardness. The surface and near surface residual compressive stresses induced by shot peening increase the fatigue strength of the material, since cracks cannot initiate or propagate in a compressive stress field. This, in accordance with the delamination theory of wear, reduces the tendency of surface asperities to fracture and separate, generating metallic wear debris. The surface compressive stresses also reduce the tendency for heat checking, which results from thermally induced cyclic tensile stresses in the surface generated by tractional loads.

Controlled shot peening differs from processes such as shot blasting, abrasive blasting, etc. in that the primary purpose of the former is to texture, strain harden, and induce residual compressive stresses in a work piece surface in a predictable, accurate and reproducible manner. The latter processes are used for the removal of contaminants and conditioning the surface for subsequent finishing. The results achieved in shot peening are controlled by: (1) selecting the size, shape, uniformity and conditions of the peening media; (2) measuring and governing the intensity, or impact energy, of the shot delivery system; and (3) manipulating and regulating the shot flow direction, the work piece movement and the exposure time to insure specified coverage and texture in all specified areas.

Pursuant to the invention, the graphitic cast iron brake drum to be surface treated is disposed in a suitable fixture so that shot provided from a peening nozzle will impact upon substantially all of the interior drum surfaces with which the brake shoes will effect frictional contact. Peening apparatus suitable for use in the process of the invention is available from Metal Improvement Company, Inc. under the trademark PEENAMATIC. The peening coverage achieved should be substantially 100% coverage. A method which may be utilized to assure that such coverage has been achieved is disclosed in Feld. U.S. Pat. No. 3,950,642, assigned to the assignee of the present invention.

The peening intensity utilized in the invention is preferably that characterized as "high intensity", this being important in order to obtain the desired depths for the surface layer in which induced residual stresses are generated.

Calibration of the impact energy or peening intensity of the shot stream is essential to controlled shot peening. The energy of the shot stream is a function of the media size, material, hardness, velocity and impingement angle. In order to specify, measure and calibrate peening impact energy, J. O. Almen of General Motors Research Laboratories developed a method utilizing SAE1070 spring steel specimens which he called Almen strips. In his method, an unpeened Almen strip is fastened to a steel block and exposed to a stream of peening shot for a given period of time. Upon removal from the block, the residual compressive stress and surface plastic deformation produced by the peening impacts will have caused the Almen strip to curve, convex on the peened surface. The height of this curvature when measured in a standard Almen gauge is called arc height.

There are three standard Almen strips currently in use: "A" strip 0.051 inch thick, "C" strip 0.094 inch thick, and "N" strip 0.031 inch thick. The approximate relationship between the A, N and C strips is: 3N=A=0.3C. The useable range of curvature on the Almen strips is 0.004 to 0.024 inch. Intensity designations include both the arc height and the type of Almen strip used, e.g. 10A intensity corresponds to 0.010 inch (0.25mm) arc height of the A strip. The depth of the compressive layer is proportional to the Almen intensity. Further details on this method of gauging or measuring peening intensity is fully disclosed in an article by H. F. Moore entitled, "Shot Peening and The Fatigue of Metals", published by the American Foundry Equipment Company, and U.S. Pat. No. 3,695,091 to Smith.

The invention is further illustrated by the following example:

EXAMPLE

The method of the present invention was practiced on a series of cast graphitic iron truck brake drums, by shot peening same using a cast steel 0.550 inch nominal diameter shot at a 4C to 6C (high) intensity with coverage at 100%. The gray iron material had an initial hardness value of RC28-30. Three brake drums which had not been subjected to the process of the invention, were installed (as controls) on large trucks, as were two of the cited ball peened brake drums. The control brake drums, and those prepared pursuant to the invention, were tested under road conditions. Specifically, the drums were subjected to a cumulative schedule of "panic" stops, first a scheduled number from 30 mph, then (cumulatively) from 50, 60, and then 70 mph. The number of such panic stops to failure of the drum was considered to be a measure of energy dissipation to failure. All of the drums performed satisfactorily through the 30 and 50 mph portions of the tests, which cumulatively ran to less than 100 stops. At the 60 mph test, which ran to the cumulative total of about 275 stops, two of the three control samples failed—at cumulative levels well below 125 stops. From 275 stops (cumulative) on, the panic stops were from 70 mph. The remaining control drum failed at a cumulative level of slightly over 300 stops—i.e. after somewhat over 25 panic stops at 70 mph. It was found that the peened brake drums displayed substantial improvements over the non-peened control samples. Among other things, the processing was found to retard initial brake slap, i.e. the shoe or pad upon application of the brake no longer pulled inboard of the brake and then slaps out. The new brake pads were also found to break in more readily with less glazing of the pad itself. Heat cracking of the drum appeared to be almost nonexistent and drum life and performance was greatly enhanced by use of the process. The two drums treated by the process of the invention showed vastly increased life and performance, with failure occurring only after about 480 stops—of which over 200 constituted panic stops from 70 mph. Particularly noteworthy is that in the instances of the drums processed by the invention, the portions of test use representing the 70 mph panic stops are many multiples of the 70 mph portion for the best control. In practice, it has been found in a series of such tests, that the overall life expectancy of a graphitic cast iron drum treated in accordance with the invention is typically extended from four to six times over the life of an untreated drum which is exposed to generally similar vehicular operating conditions.

While the present invention has been set forth in terms of specific embodiments thereof, it will be understood in view of the instant disclosure that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A method for enhancing the frictional wear properties, performance and life of a graphitic cast iron brake drum, comprising:
   cold working the surfaces of said drum which are frictionally engaged by brake shoes, by subjecting said surfaces to shot peening at an intensity level sufficient to induce surface and near surface residual stress, to thereby increase the resistance of said graphitic cast iron to scuffing and heat checking under conditions of dry sliding contact and frictional loading; said shot peening being effected by impacting said surface with shot having a nominal diameter of from about 0.230 to 0.660 inch to achieve substantially 100% coverage.

2. A method in accordance with claim 1, wherein the peening intensity is in the range of from 4C to 6C as measured by the Almen method.

3. A method in accordance with claim 2, wherein said shot has a nominal diameter in the range of from about 0.330 to 0.550 inch.

4. A method in accordance with claim 3, wherein said shot has a nominal diameter of about 0.550 inch.

5. A method for increasing the resistance of a graphitic cast iron brake drum to scuffing and heat checking under the conditions of dry sliding contact and frictional loading which are imposed by frictional engagement with brake shoes, comprising:
subjecting the surface of said drum which is engaged by said brake shoes to high intensity shot peening, to thereby induce residual stress of said surfaces and the underlying layer contiguous thereto; said peening being effected utilizing cast steel shot having a nominal diameter in the range of from about 0.330 to 0.550 inch, and wherein the peening intensity is in the range of from 4C to 6C as measured by the Almen method.

* * * * *